United States Patent [19]
Amada et al.

[11] Patent Number: 5,857,661
[45] Date of Patent: Jan. 12, 1999

[54] VALVE DRIVE CONTROL METHOD, VALVE DRIVE CONTROL APPARATUS AND FLUID MEMBER SUPPLY APPARATUS

[75] Inventors: Haruo Amada, Saitama-ken; Takashi Komatsu, Kokubunji, both of Japan

[73] Assignees: Hitachi, Ltd.; Koganei Corporation, both of Tokyo, Japan

[21] Appl. No.: 550,373

[22] Filed: Oct. 30, 1995

[30] Foreign Application Priority Data

Nov. 1, 1994 [JP] Japan ................................. 6-268547

[51] Int. Cl.⁶ .................................................. F16K 31/12
[52] U.S. Cl. ...................... 251/57; 251/61.1; 137/467.5
[58] Field of Search ..................... 137/467.5, 4; 251/57, 251/61.1

[56] References Cited

U.S. PATENT DOCUMENTS

| | | | |
|---|---|---|---|
| 1,810,353 | 6/1931 | Johnson | 251/57 |
| 3,039,733 | 6/1962 | Mattioli | 251/57 |
| 3,677,248 | 7/1972 | McPhee | 137/127 |
| 4,549,570 | 10/1985 | Cvok et al. | 137/467.5 |
| 5,090,660 | 2/1992 | Ratelbund | 251/61.1 |
| 5,158,230 | 10/1992 | Curran | 251/61.1 |

FOREIGN PATENT DOCUMENTS

| | | |
|---|---|---|
| 54-48160 | 4/1979 | Japan . |
| 57-177365 | 11/1982 | Japan . |
| 57-177570 | 11/1982 | Japan . |
| 60-95977 | 5/1985 | Japan . |
| 64-500135 | 1/1989 | Japan . |
| 2-81630 | 6/1990 | Japan . |
| 60-95977 | 5/1995 | Japan . |
| 7565 | 12/1951 | Netherlands ............................ 251/57 |

*Primary Examiner*—A. Michael Chambers
*Attorney, Agent, or Firm*—Fay, Sharpe, Beall, Fagan, Minnich & McKee

[57] ABSTRACT

A valve drive control apparatus having a communication unit for communicating a flow-in-side tube path with a flow-out-side tube path, which guide a fluid member, and a control medium storage chamber into which an attenuation characteristic control medium is filled. The valve drive control apparatus further includes an elastic deform member for defining the communication unit and the control medium storage chamber, a drive unit for pressuring the attenuation characteristic control medium so as to deform the elastic deform member via the attenuation characteristic control medium, and also a control unit for controlling the drive unit based on a drive control valve obtained from a valve drive characteristic representative of a relationship between a deform amount of a valve mechanism unit and a drive pressure value of the valve mechanism unit. The valve drive characteristic is acquired from a dynamic fluid characteristic of the fluid member and a dynamic fluid characteristic of the attenuation characteristic control medium.

7 Claims, 14 Drawing Sheets

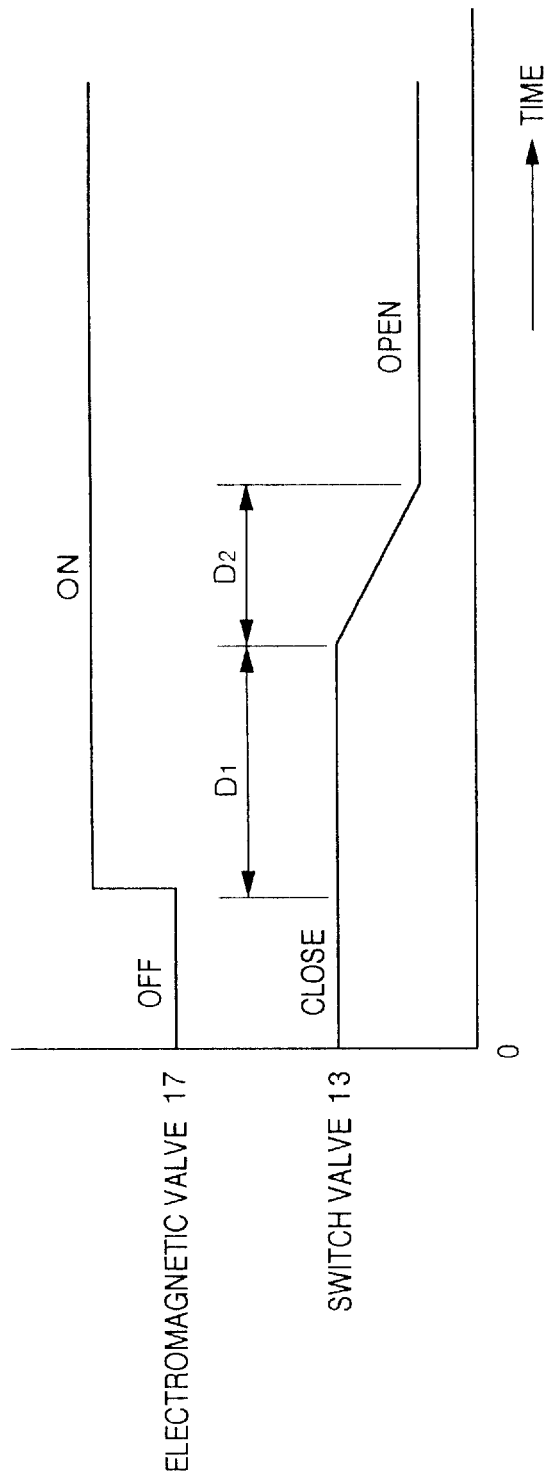

NORMAL CASE

FAST CASE

DELAY CASE

VALVE DRIVE CONTROL METHOD, VALVE DRIVE CONTROL APPARATUS AND FLUID MEMBER SUPPLY APPARATUS

BACKGROUND OF THE INVENTION

The present invention relates to a valve control technique for controlling operations of valves provided in supply tube paths used to guide fluids such as medical fluids.

Begining to the semiconductor wafer manufacturing technique, in manufacturing processes in the various technical fields such as the LCD (liquid crystal display) substrate manufacturing technique, the magnetic disk manufacturing technique, and the multi-layer wiring pattern substrate manufacturing technique, there are utilized such chemical medical fluids as photoresist fluids, spinion glass fluids, polyimid resin fluids, pure water, developing fluids (alkalic medical fluids) etching fluids (acid medical fluids), and organic solvent. These medical fluids own various coefficients of viscosity from low coefficients to high coefficients. The fluid supply unit such as the pump is connected with the fluid flow-out unit such as the nozzle by the fluid supply tube path. In this fluid supply tube path, there is provided a valve for controlling the fluid such as the medical fluid flowing through this fluid supply tube path, namely for controlling the flow of the fluid member.

In the above-described various technical fields, not only impurities such as articles and bubbles are required not to be mixed into the fluid member, but also the valve for supplying a predetermined amount of the fluid member in high precision must be controlled under better precision. For instance, in the resist fluid supply control apparatus for dripping the photoresist fluid onto the surface of the semiconductor wafer, the switch valve must be employed so as to control opening/closing operations of the resist supply dripping nozzle by opening/closing the tube path for supply the fluid member, and furthermore it is required to prevent the resist fluid from being leaked from the dripping nozzle when the fluid dripping is stopped.

To avoid that unwanted articles are mixed into the supplied medical fluid such as the resist fluid, the filter, pump and control valve are combined in an integral form so as to reduce the fluid reserved amount within the fluid supply system, thus constituting the pump containing the filter, as described in JP-A-64-500135.

Moreover, JP-A-2-81630(U) discloses such a suck-back valve for sucking back the medical fluid into the dripping nozzle when the supply of the medical fluid is stopped in order to prevent the fluids from being leaked from the dripping nozzle after the medical fluid has been supplied.

In the former-mentioned medical fluid supply control apparatus as described in JP-A-64-500135, the diaphragm film is pressured, or controlled under negative pressure, so as to deform/control this diaphragm film, and such a valve is employed by which the supply of medical fluids from the flow path formed by the diaphragm film is performed/interrupted.

Since the compressed control member such as air is directly given to the diaphragm film so as to control the pressure in this valve, it is no possible to absorb the pressure variations of the fluid member produced in conjunction with the hammering phenomenon occurred in the medical fluid when the valve is open/closed. Therefore, erroneous operation of the valve is caused by the hammering phenomenon, so that the valve is mistakenly open/closed, resulting in various fluid dripping problems. Moreover, since the flow path structure of the valve is folded, the cavitation phenomenon happens to occur when the medical fluid is supplied, so that bubble would be produced and qualities of the medical fluids would be deteriorated.

In the latter-mentioned fluid-droplet preventing apparatus described in JP-A-2-81630(U), the air pressure valve effect to the suck-back valve body having the diaphragm film structure is controlled by the electric/air converting regulator, so that the operation speed and the operation amount of the suck-back valve body are controlled.

This control method corresponds to such a method for controlling pressure of the compressed air given to the suck-back valve unit in order to control the operation speed and the operation amount of the suck-back valve body. Similar to the above-described medical fluid supply control apparatus described in JP-A-64-500135, it is not possible to absorb variations in the fluid pressure in conjunction with the hammering phenomenon occurred when another fluid supply valve constructed in the fluid supply system is open/closed. Thus, the suck-back operation timing of the suck-back valve body having the diaphragm film structure is mistakenly performed due to the hammering phenomenon, and furthermore, the suck-back valve body is erroneously operated due to the insufficient suck-back operation speed, resulting in various fluid dripping problems.

As described above, in the conventional technical methods, the operation of the valves for controlling the supply of the fluid member such as the medical fluid cannot be controlled in high precision, so that various fluid dripping problems are caused by mistakenly operating the valves. As a consequence, Inventors of the present invention could confirm that a predetermined amount of fluid members cannot be supplied while maintaining high purity of the fluid members.

FIG. 1 schematically shows a valve under develop as a comparison example. This valve is provided in a supply tube path for connecting a pump (not shown) for supplying a medical fluid as a fluid member with an exhaust unit for exhausting the fluid member. The valve is employed so as to open/close the supply tube path. As indicated in FIG. 1, a flow-in-side tube path 2 and a flow-out-side tube path 3 are provided in a housing 1, and a diaphragm type valve body 4 is mounted on this housing 1 in order to open/close both of the flow paths.

To open/close this valve body 4, a piston 5 having a piston rod 5a is movably provided within the housing 1 along the shaft direction. A coil spring 6 is employed in the piston 5, which may give spring force to close the valve body 4. This piston 5 is operable in response to the air pressure supplied/exhausted from two supply/exhaust ports 7 and 8 connected to the housing 1.

Similar to the above-mentioned prior art, when the supply of the fluid member such as the medical fluid is controlled by the switch valve having such a structure, erroneous operations of this valve happen to occur, resulting in various fluid dripping problems. The causes of these problems may be revealed.

To find out the causes, a drive model of the valve operation mechanism unit for operating the valve body 4 shown in FIG. 1 is schematically illustrated in FIG. 2. As shown in this drive mode, it is conceivable that the valve mechanism unit V to achieve the valve function for opening/closing the supply of the fluid member L owns an elastic body S having the spring constant K containing the valve body 4 shown in FIG. 1 and the coil spring 6. This valve mechanism unit V is deformed by the air pressure. As a means for controlling deformation of this valve mechanism unit V, the air pressure is effected from a valve drive operation point P.

As represented in this drive model, when a temporal pressure variation ΔP1 is produced in the fluid member L, a displacement amount X1 of the valve mechanism unit V in proportion to this pressure variation ΔP1 is produced. In this type of valve mechanism unit V, the absorption of the energy amount with respect to the displacement amount X1 of the valve mechanism unit V when the temporal pressure variation ΔP1 is produced in the fluid member L may exist as only the absorption of the energy amount caused by the spring deformation only with the spring constant $K_{V1}$ constituted by the valve mechanism unit V.

Accordingly, a relative formula concerning the energy amount absorption of the pressure variation amount ΔP1 of the fluid member L is expressed as follows:

$$\Delta P1 = K_{V1} \times X_1.$$

In this formula, symbol ΔP1 denotes the pressure variation amount of the fluid member L, symbol $K_{V1}$ represents the spring constant of the valve mechanism unit V, and symbol $X_1$ shows the displacement amount of the valve mechanism unit V.

It could be understood from such a relative formula that the pressure variation amount $\Delta P_1$ of the fluid member is directly connected to the energy conversion of the displacement amount $X_1$ of the valve mechanism unit V by way of the linear formula. As a consequence, when such a valve as shown in FIG. 1 is employed so as to control the supply of the fluid member such as the medical fluid, the valve mechanism unit V itself would be deformed by receiving the pressure variations in the fluid member flowing through the tube path, and thus the valve is erroneously operated.

In FIG. 3 there is shown a medical fluid supply control apparatus such that both of a switch valve 13 operable by air pressure, namely the valve having the same structure as FIG. 1, and also a suck-back valve 14 having a similar structure thereto are provided in a medical fluid supply tube path 12a which is employed so as to couple a medical fluid supply unit 10 with a dripping nozzle for supplying the medical fluid to the semiconductor wafer W. The switch valve 13 is operable in response to the pressure of air supplied from an air supply source 15 via a flow rate control valve 16. The supply of the air pressure to the switch valve 13 is controlled by way of an electromagnetic valve 17 operated by a solenoid and provided in an air pressure distribution tube 12b. The supply of electric power to the solenoid of the electromagnetic valve 17 is controlled in response to ON/OFF signals derived from a power source 18.

On the other hand, as represented in FIG. 3, after the spraying operation of the medical fluid from the dripping nozzle 11 to the semiconductor wafer W has been accomplished, the suck-back valve 14 is provided in the medical fluid supply tube path 12a in order that the medical fluid is sucken back to the dripping nozzle 11 to thereby preventing the fluid dripping. This suck-back valve 14 is operable in response to the compressed air which is fed from the air pressure source 15a via the air pressure distribution tube 12c. In this air pressure distribution tube 12c, there are provided a regulator for setting pressure of the compressed air derived from the air pressure source 15a to a preselected pressure value, and also a speed (velocity) control valve 20 for controlling a flow speed of the compressed air.

FIG. 4 is a timing chart for indicating operation conditions of the switch valve 13 employed in the medical supply control apparatus shown in FIG. 3. Under such a condition that no electric power is supplied to the electromagnetic valve 17, the switch valve 13 is normally closed. In other words, the medical fluid from the medical fluid supply unit 10 is not yet supplied to the dropping nozzle 11. Under this condition, when the ON signal is supplied from the power source 18 to the electromagnetic valve 17, the compressed air supplied from the air pressure source 15 is supplied via the air pressure distribution tube 12b to the switch valve 13, so that the switch valve 13 is changed from the close state into the upon state.

As the switching operation timing, a delay time D1 is produced after the electromagnetic valve 17 is changed from the OFF state into the ON state until the switch valve 13 starts its operation. Thereafter, an operation time D2 is produced until the opening operation of the switch valve 13 is ended, so that the opening operation of the switch valve 13 is complete. Also when the switch valve 13 is open and then closed, a similar delay time and a similar operation time are produced.

It could be recognized that both of the delay time D1 and the operation time D2 when the open state of the switch valve 13 is changed into the close state are varied based on the open-degree control amount for the flow-rate control valve 16 in the case that the supply amount containing the pressure of the compressed air derived from the air pressure source 15 is maintained at constant.

A table 1 indicates measurement results as to the delay time D1 and the operation time D2 while the control amount of the flow-rate control valve 16, i.e., the rotation amount of the control knob is varied.

TABLE 1

| control amount of flow-rate control valve 16 | 0.5 turn | 1.0 turn | 1.5 turns |
|---|---|---|---|
| delay time D1 (sec) of switch valve 13 | 0.52 | 0.22 | 0.17 |
| operation time D2 (sec) of switch valve 13 | 0.37 | 0.19 | 0.13 |
| total time | 0.89 | 0.41 | 0.30 |

As described above, in the medical fluid supply control apparatus of FIG. 3 with employment of the switch valve 13 similar to the valve shown in FIG. 1, the opening degree of the flow-rate control valve 16 must be manually controlled. Thus, there is a fluctuation in this control amount, so that a total time after the ON/OFF operation timing of the electromagnetic valve 17 until the close operation of the switch valve 13 is accomplished differs from each other.

When the opening degrees of the flow-rate control valve 16 are different from each other, the opening/closing operation times of this switch valve 13 are different from each other, so that the supply speeds of the medical fluid supplied from the dripping nozzle 11 to the semiconductor wafer W are different from each other. As a consequence, in the actual medical fluid supply stem, as explained before, the opening/closing operation times of the switch valve 13 are different from each other even by the medical fluid pressure variation amount caused by the hammering phenomenon which occurs when the other switch valve 13 is open/closed. In connection thereto, the supply speeds of the medical fluid from the dripping nozzle 11 via the switch valve 13 would be different from each other.

As a result, various fluid dripping problems may be produced due to erroneous operations of the switch valve 13. Therefore, the above-described problems may be emphasized in such a medical fluid supply system with employment of large quantities of switch valves.

FIG. 5A, FIG. 5B and FIG. 5C schematically illustrate various conditions when the suck-back operation is accomplished by operating the suck-back valve 14 after the spraying operation of the medical fluid by the dripping nozzle 11 is ended, i.e., FIG. 5A shows the normal suck-back operation, and FIGS. 5B, 5C indicate the abnormal suck-back operations. More specifically, FIG. 5A shows such a condition that the medical fluid is drawn into the dripping nozzle 11 when the suck-back speed is performed at the normal speed. FIG. 5B indicates such a state that bubble is produced in the drawn medical fluid when the suck-back speed is increased. FIG. 5C represents such a condition that the suck-back speed is delayed, so that the suck-back function cannot be achieved and then spray fluctuation occurs.

As described above, after the medical fluid has been sprayed from the dripping nozzle 11, if the sprayed medical fluid is not sucken at the proper timing and the proper speed in high precision into the dripping nozzle 11, then the spray fluctuation happens to occur, so that the process yield of the semiconductor wafer would be lowered.

SUMMARY OF THE INVENTION

An object of the present invention is to provide a technique capable of controlling in high precision operation of a valve used to control a flow of a fluid member such as a medical fluid.

The above-described object, other objects and novel features of the present invention will become apparent from the descriptions of this specification and the accompanying drawings.

A typical inventive idea of the present invention is simply summarized as follows:

That is, a valve drive control method, according to the present invention, is featured by:

acquiring a relationship between a deform amount of a valve mechanism unit and a drive pressure value of the valve mechanism unit based upon a dynamic fluid characteristic of a fluid member flowing through a communication unit, and a dynamic fluid characteristic of an attenuation characteristic control medium within a control medium storage chamber formed via an elastic deform member in said communication unit;

calculating a drive condition value to be applied to said attenuation characteristic control medium based on said acquired valve drive characteristic; and driving said attenuation characteristic control medium based on said acquired drive condition valve to control an open degree within said communication unit through said attenuation characteristic control medium.

Also, a valve drive control apparatus, according to the present invention, is featured by comprising: a housing provided with a flow-in-side tube path and a flow-out-side tube path, which each guides a fluid member, and also a communication unit for communicating with said tube paths;

an elastic deform member for defining a control medium storage chamber into which an attenuation characteristic control medium is filled and said communication unit, formed in said housing;

a drive unit for applying pressure to said attenuation characteristic control medium so as to deform said elastic deform member via said attenuation characteristic control medium; and a control unit for controlling said drive unit based on a drive control valve obtained from a valve drive characteristic representative of a relationship between a deform amount of a valve mechanism unit and a drive pressure value of the valve mechanism unit, said valve drive characteristic being acquired from a dynamic fluid characteristic of said fluid member and a dynamic fluid characteristic of said attenuation characteristic control medium.

As the attenuation characteristic control medium a fluid having a viscosity attenuation characteristic, powder, or a mixture of a fluid and powder is utilized.

Further, in accordance with the valve drive control apparatus of the present invention, said communication unit is provided in such a manner that said communication unit penetrates through said control medium storage chamber; said elastic deform member for defining said communication unit and said control medium storage chamber owns a ring-shaped section perpendicular to said communication unit; and said valve drive control apparatus further comprises a coma within said communication unit; and also said control means includes means for controlling a fluid condition of said fluid member based on said drive control valve to control a distance between said coma and said elastic deform member.

In the valve drive control apparatus with employment of the come, the elastic deform member is deformed to make a contact with the coma, or separated from the coma, and further, the separating distance is controlled, so that it is possible to use as a switch valve. Since the elastic deform member is separated from the coma, it is also possible to use as a suck-back valve by controlling the separation distance.

Now, the valve drive control method and also the arrangement of the valve drive control apparatus, according to the present invention, will be expressed in the following items:

[1] A valve drive control method comprising the steps of:

acquiring a valve drive characteristic indicative of a relationship between a deform amount of a valve mechanism unit and a drive pressure value of the valve mechanism unit based upon a dynamic fluid characteristic of a fluid member flowing through a communication unit, and a dynamic fluid characteristic of an attenuation characteristic control medium within a control medium storage chamber formed via an elastic deform member in said communication unit;

calculating a drive control value to be applied to said attenuation characteristic control medium based on said acquired valve drive characteristic; and driving said attenuation characteristic control medium based on said acquired drive control valve to control an open degree within said communication unit through said attenuation characteristic control medium.

[2] A valve drive control apparatus comprising:

a housing provided with a flow-in-side tube path and a flow-out-side tube path, which each guides a fluid member, and also a communication unit for communicating with said tube paths;

an elastic deform member for defining a control medium storage chamber into which an attenuation characteristic control medium is filled and said communication unit, formed in said housing;

a drive unit for applying pressure to said attenuation characteristic control medium so as to deform said elastic deform member via said attenuation characteristic control medium; and a control unit for controlling said drive unit based on a drive control valve obtained from a valve drive characteristic representative of a relationship between a deform amount of a valve mechanism unit and a drive pressure value of the valve mechanism unit, said valve drive characteristic being acquired from a dynamic fluid characteristic of said fluid member and a dynamic fluid characteristic of said attenuation characteristic control medium.

[3] A valve drive control apparatus as recited in item 2 wherein:

said drive unit includes an expanding/contracting member elastically deformed by a gas member; and said control unit includes an electric signal generating unit for generating an electric control amount corresponding to said drive control value; and a pressure setting unit for setting pressure of the gas member corresponding to the electric control amount generated from said electric signal generating unit.

[4] A valve drive control apparatus as recited in item 2 wherein:

said drive unit includes a pressure applying member physically displaced; and said control unit includes an electric signal generating unit for generating an electric control amount corresponding to said drive control value; and a pressure setting unit for setting a displacement valve of said pressure applying member corresponding to the electric control amount generated from said electric signal generating unit.

[5] A valve drive control apparatus as recited in item 2 wherein:

said attenuation characteristic control medium includes a fluid having a viscosity attenuation characteristic, powder, or a mixture of a fluid and powder.

[6] A valve drive control apparatus as recited in item 2 wherein:

said communication unit is provided in such a manner that said communication unit penetrates through said control medium storage chamber; said elastic deform member for defining said communication unit and said control medium storage chamber owns a ring-shaped section perpendicular to said communication unit; and said valve drive control apparatus further comprises a coma within said communication unit; and also a fluid condition of said fluid member is controllable based on said drive control value to control a distance between said coma and said elastic deform member.

In a valve drive control apparatus said communication unit is provided in such a manner that said communication unit penetrates through said control medium storage chamber; said elastic deform member for defining said communication unit and said control medium storage chamber owns a circular-shaped section perpendicular to said communication unit; and said valve drive control apparatus further comprises a coma within said communication unit; and also a flow rate of said fluid member is controllable based on a distance between said coma and said elastic deform member.

[7] A fluid member supply control apparatus equipped with a fluid member supply unit, a fluid member flow-out unit, and at least one valve provided within a tube path for connecting said fluid member supply unit to said fluid member flow-out unit, for changing an open degree of a communication unit for communicating a fluid member flow-in tube path with a fluid member flow-out tube path to thereby control a fluid condition of the fluid member, wherein:

said at least one valve includes:

a control medium storage chamber into which an attenuation characteristic control medium is filled, an elastic deform member for defining said control medium storage chamber and said communication unit;

a drive unit for pressuring said attenuation characteristic control medium to deform said elastic deform member via said attenuation characteristic control medium; and control means for controlling said drive means based on a drive control value obtained from a valve drive characteristic representative of a relationship between a deform amount of a valve mechanism unit and a drive pressure value of the valve mechanism unit, said valve drive characteristic being acquired from a dynamic fluid characteristic of said fluid member and a dynamic fluid characteristic of said attenuation characteristic control medium.

[8] A fluid member supply control apparatus as recited in item 7 wherein:

said valve for deforming said elastic deform member via said attenuation characteristic control medium is a switch valve for opening/closing said communication unit.

[9] A fluid member supply control apparatus as recited in item 7 wherein:

said valve for deforming said elastic deform member via said attenuation characteristic control medium is a suck-back valve for changing a volume of said communication unit.

In the above-described valve drive control method and valve drive control apparatus, since it can set the drive condition valve for changing the open degree of the communication unit by the elastic deform member via the attenuation characteristic control medium based on the dynamic fluid characteristic of the fluid member and the dynamic fluid characteristic of the attenuation characteristic control medium, this drive condition valve may be corrected as an optimum drive condition value corresponding to the characteristic of the supplied fluid member, so that the open degree of the communication unit can be set in high precision.

Even when the temporal pressure variation is produced in the supplied fluid member, this pressure variation may be absorbed by the attenuation characteristic control medium, which never gives any external disturbance. As a consequence, the operations of the valve mechanism unit can be controlled based only upon the valve drive condition executed to the attenuation characteristic control medium.

Moreover, in the above-described fluid member supply control apparatus, since the valve is provided in the tube path for coupling the fluid member supply unit to the fluid member flow-out unit, even when the hammering phenomenon occurs due to the opening/closing operation of another valve provided in this tube path, which causes the pressure variation in the fluid member, this pressure variation may be absorbed, so that the erroneous operation of the valve can be prevented. Even in such a fluid member supply control apparatus that a plurality of valves are formed in a single fluid member supplying tube path, these valves do not give any adverse influences to each other, but the valves can be operated at preselected timings in high precision.

The advantages achieved by the typical valve drive control method/apparatus and the typical fluid member supply control apparatus, according to the present invention, will now be briefly explained as follows:

(1) The communication unit of the fluid member within the valve is located adjacent to the control medium storage chamber via the elastic deform member, and the attenuation characteristic control medium is filled into this control medium storage chamber, and also the elastic deform member is driven via the attenuation characteristic control medium by the drive means. As a consequence, even when the pressure variation is produced in conjunction with the hammering phenomenon occurred in the fluid member during the valve operation, this pressure variation can be absorbed by the attenuation characteristic control medium. As a result, even if the pressure variation is produced in the fluid member, this pressure variation never gives as external disturbance to the respective valve drive units. Thus, the valve operation can be precisely controlled without any erroneous operation.

(2) When the valve according to the present invention is applied as the suck-back valve, since the volume change amount in the suck-back chamber can be precisely controlled without being adversely influenced by the pressure variation in the fluid member, the suck-back operation timing, the suck-back speed, the suck-back time, and further the suck-back amount can be controlled with better reproducibility.

(3) In combination with the above-described advantage (2), since the suck-back valve operation can be controlled with better reproducibility, the optimum suck-back control condition can be determined, so that the suck-back state of the fluid member within the dripping nozzle can be maintained at constant. Accordingly, neither the fluid droplet, nor the fluid separation phenomenon happens to occur.

(4) In combination with the above-described advantage (3), since the suck-back state of the medical fluid can be kept constant, such a problem that the medical fluid jumps from the dripping nozzle, resulting in the dirty tip portion of the dripping nozzle can be solved.

(5) Since the valve drive operation can be controlled in higher precision, the operation speed of the valve for controlling the supply of the fluid member such as the medical fluid is controlled to a preselected valve, so that such a rapid negative pressure phenomenon caused by the valve operation can be suppressed, it is possible to avoid productions of bubble, namely gas member which are caused by supplying the fluid member such as the medical fluid. In addition, since either the rapid pressure applying phenomenon, or the rapid negative pressure phenomenon caused by the valve operation can be suppressed, it is possible to avoid deterioration of the fluid member such as the medical fluid caused by the rapid pressure applying phenomenon as well as the rapid negative phenomenon.

(6) In the system for supplying the fluid member such as the medical fluid, either one valve, or plural valves can be precisely controlled, and moreover, these valves can be controlled under precise operation timing. As a result, such a high-precision/clean fluid member supply system can be realized.

(7) In combination with the above-described advantages (1) to (6), various problems can be prevented. That is, bubbles are produced from the fluid member such as the medical fluid, gel articles are produced due to deterioration of the fluid member, and particles such as gel articles are produced. Eventually, a preselected amount of fluid member such as a medical fluid can be supplied under clean condition at constant speed.

(8) since a predetermined amount of fluid member such high-purity medical fluid with less mixture can be supplied at constant speed, the present invention is applied to such a semiconductor wafer manufacturing/process apparatus as a photoresist coating/develop processing apparatus, a spinion glass (SOG) coating apparatus, a polyimid resin coating apparatus, and an etching processing apparatus, and also to a TFT manufacturing process apparatus. As a consequence, a total number of dirty articles attached to the semiconductor wafer, or the TFT substrate can be suppressed, or reduced, so that the semiconductor elements and the TFT elements can be manufactured with high quality.

BRIEF DESCRIPTION OF THE DRAWINGS

The above-described objects and other features of the present invention may be achieved by reading the detailed descriptions in conjunction with the accompanying drawings, in which:

FIG. 4 is a graphic representation of a relationship between the control amount of the conventional flow-rate control valve and the valve operation delay;

DESCRIPTION OF THE PREFERRED EMBODIMENTS

Referring now to drawings, various embodiments of the present invention will be described.

Figure 6:
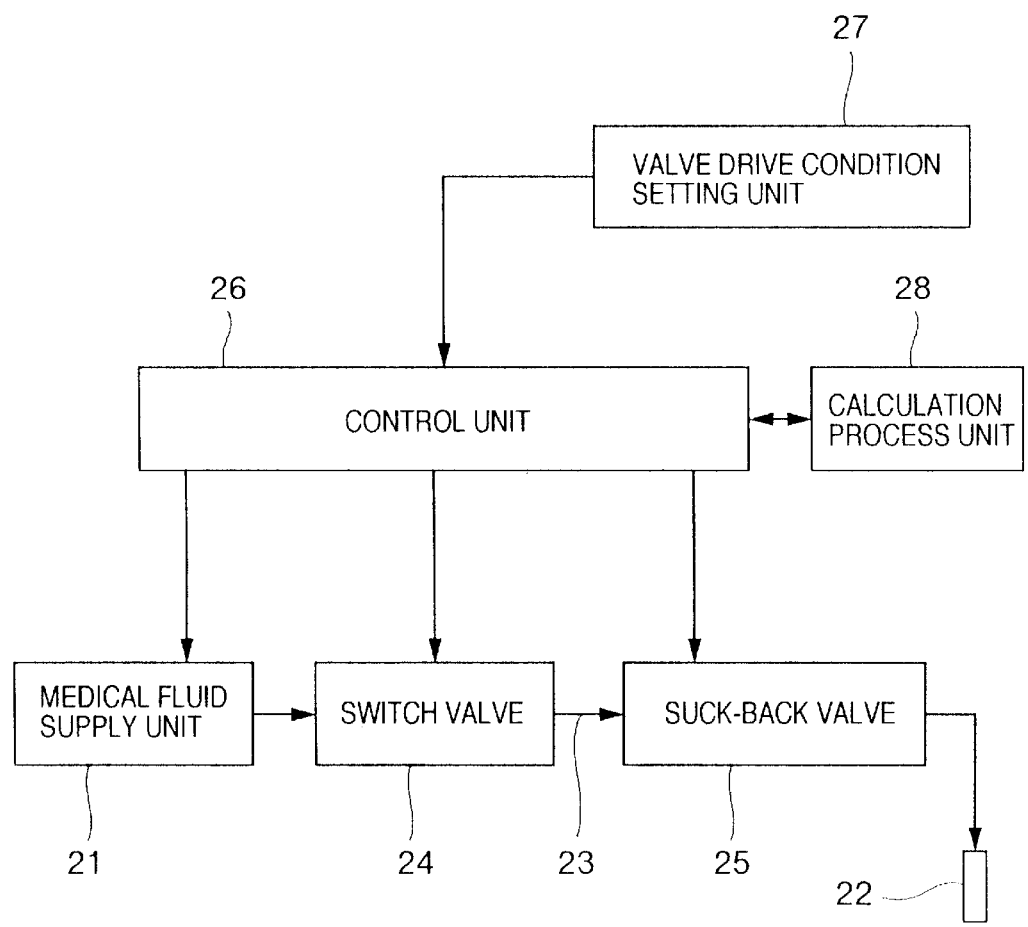
FIG. 6 schematically indicates a system arrangement of a fluid member supply control apparatus.

FIG. 6 schematically indicates a system arrangement of a medical fluid supply control apparatus equipped with a valve drive control apparatus according to an embodiment of the present invention. This medical fluid supply control apparatus is applied to a photoresist process stage at which a semiconductor element pattern on a semiconductor wafer.

A medical fluid supply unit 21 contains a pump for supplying a photoresist fluid stored in a medical fluid container (vessel) (not shown). A dripping nozzle 22 for ejecting the photoresist supplied from this medical fluid supply unit 21 is connected by a supply tube path 23 to the medical fluid supply unit 21. Within this supply tube path 23, there are provided a switch valve 24 for supplying the medical fluid and for interrupting the supply of this medical fluid, and also a suck-back valve 25 for sucking (drawing) back a predetermined amount of medical fluid into the dripping nozzle 22 so as to prevent the medical fluid from being dropped out after a preselected amount of medical fluid is ejected, namely dripped from the dripping nozzle 22, when this fluid ejection is stopped.

Operations of these medical fluid supply unit 21, switch valve 24, and suck-back valve 25 are controlled by a control unit 26, respectively. The valve drive condition information is inputted from a valve drive condition setting unit 27 into this control unit 26. The valve drive condition information contains a dripping amount of the medical fluid dripped from the dripping nozzle 22, either a dripping speed or dripping hour, a suck-back amount of the medical fluid sucked back to the dripping nozzle 22, either a suck-back speed or suck-back hour, and a dynamic fluid characteristic (for instance, a coefficient of viscosity) of the medical fluid corresponding to the fluid member to be supplied. This control unit 26 accesses to a calculation process unit 28 to derive information on variation amounts with respect to the respective valve mechanism units for the switch valve 24 and the suck-back valve 25.

In the calculation process unit 28, an optimum drive pressure value of the valve mechanism unit, corresponding to one of the valve drive condition valves so as to drive/control these valves 24 and 25 in response to the information about the variation amount of the valve mechanism unit, which is supplied from the control unit 26, is calculated and then determined.

Figure 7:
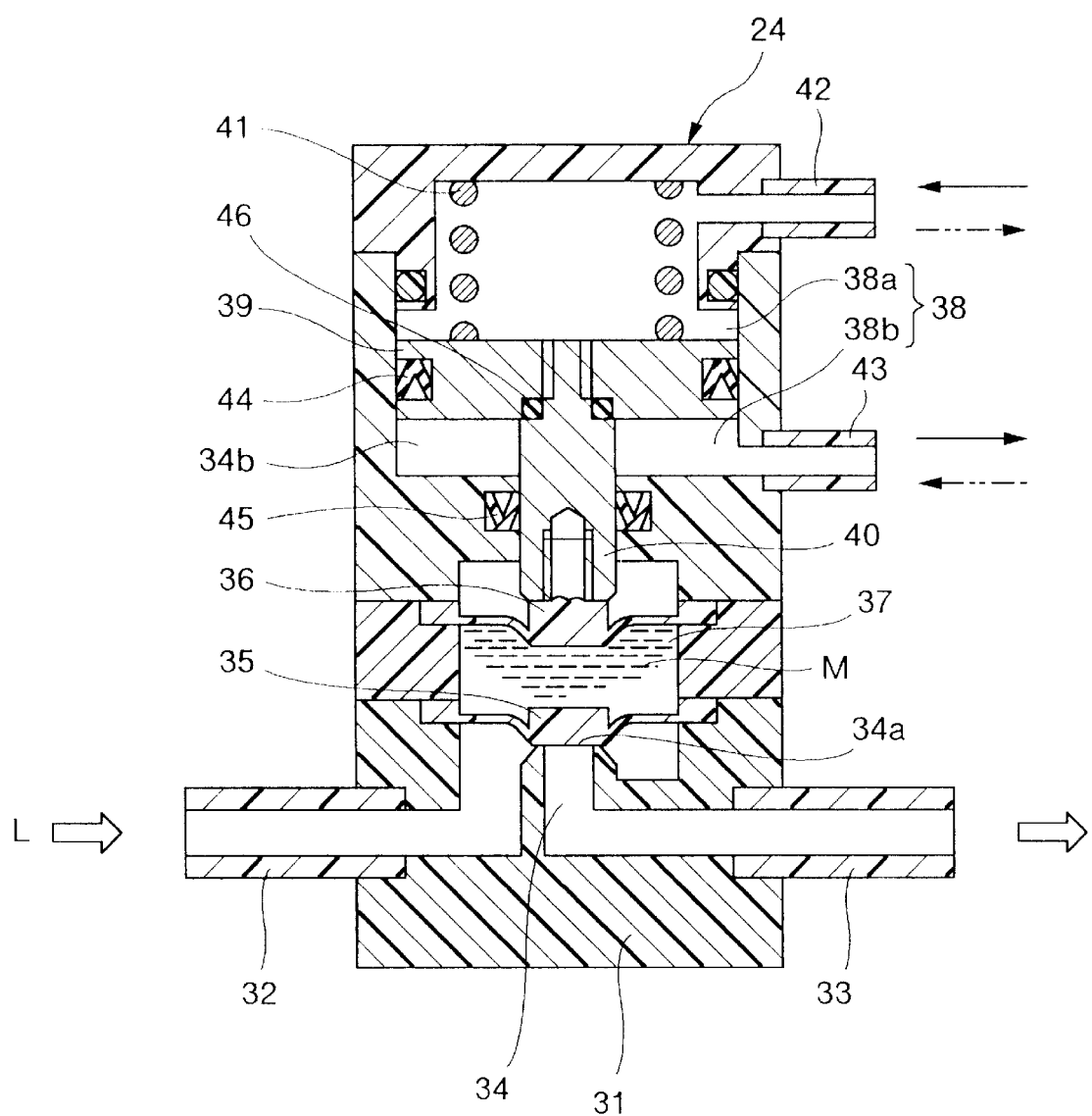
FIG. 7 is a sectional view for indicating a switching valve according to an embodiment of the present invention.

FIG. 7 indicates the switch valve 24 of FIG. 6 in detail. Both of a flow-in-sided tube path 32 and a flow-out-sided tube path 33 are connected to a housing 31 of the valve 24. An elastically deformable diaphragm valve body 35 is mounted as an elastic deforming member to the housing 31, and is moved close to/apart from a valve seat portion 34a formed in a communication portion 31 for communicating these tube paths 32 and 33.

A diaphragm drive film 36 is mounted within the housing 31 in such a manner that this diaphragm is located apart from the diaphragm valve body 35 by a predetermined distance. A control medium storage chamber 37 is fabricated between the diaphragm valve body 35 and the diaphragm drive film 36. An attenuation characteristic control medium M is sealed into this control medium storage chamber 37. The attenuation characteristic control medium M implies a medium having a coefficient of viscosity such as a fluid, powder, and a mixture of a fluid and powder. To open/close the diaphragm valve seat 35 through the attenuation characteristic control medium M by driving the diaphragm drive film 36, a piston 39 is slidably mounted in a cylinder chamber 38 formed in the housing 31. The diaphragm drive film 36 is provided at a tip portion of a piston rod 40 mounted on this piston 39. Both of this diaphragm drive film 36 and the piston 39 constitute a drive means.

A spring force by a coil spring 41 is applied, or exerted to the piston 39 along such a direction that the piston 39 is advanced toward the diaphragm drive film 36. Both of a supply/exhaust port 42 communicated with a pressure chamber 38a provided at one side of the cylinder chamber 38, and also another supply/exhaust port 43 communicated with another pressure chamber 38b provided at the other side of the cylinder chamber 38. As indicated by an arrow of a two-dot/dash line of FIG. 7, when the compressed air is supplied from the supply/exhaust port 43 into the pressure chamber 38b, the piston 39 is moved backwardly against the spring force of the coil 41 to open the diaphragm valve seat 35. On the other hand, as indicated by an arrow of a solid line, when the compressed air is supplied from the supply/exhaust port 42 into the pressure chamber 38a, the piston 39 is moved forwardly to close the diaphragm valve seat 35. In FIG. 7, reference numerals 44 and 45 indicate a V-packing, respectively, and reference numeral 46 shows an O-ring.

The housing 31 is constructed by assembling a plurality of blocks, each of which is fabricated by tetrafluoroethyleneperfluoroalkilvinylether copolymer (will be abbreviated as a "PFA" hereinafter). Also, the diaphragm valve seat 35 and the diaphragm drive film 36 is made of polytetrafluoroethylene (will be abbreviated as a "PTFE" hereinafter).

As the attenuation characteristic control medium sealed into the control medium storage chamber 37, there are utilized a non-compressive fluid such as pure water, polyethylene glycol, and fluorocarbon polymer oil; powder such as PFA fluorocarbon polymer powder; and a mixture made of a non-compressive fluid with powder. Then, a selection is made of such an attenuation characteristic control medium M having a desirable coefficient of viscosity attenuation. This attenuation characteristic control medium M attenuates/absorbs temporal pressure variation energy of the medical fluid L flowing through the valve as the fluid member.

Figure 8:
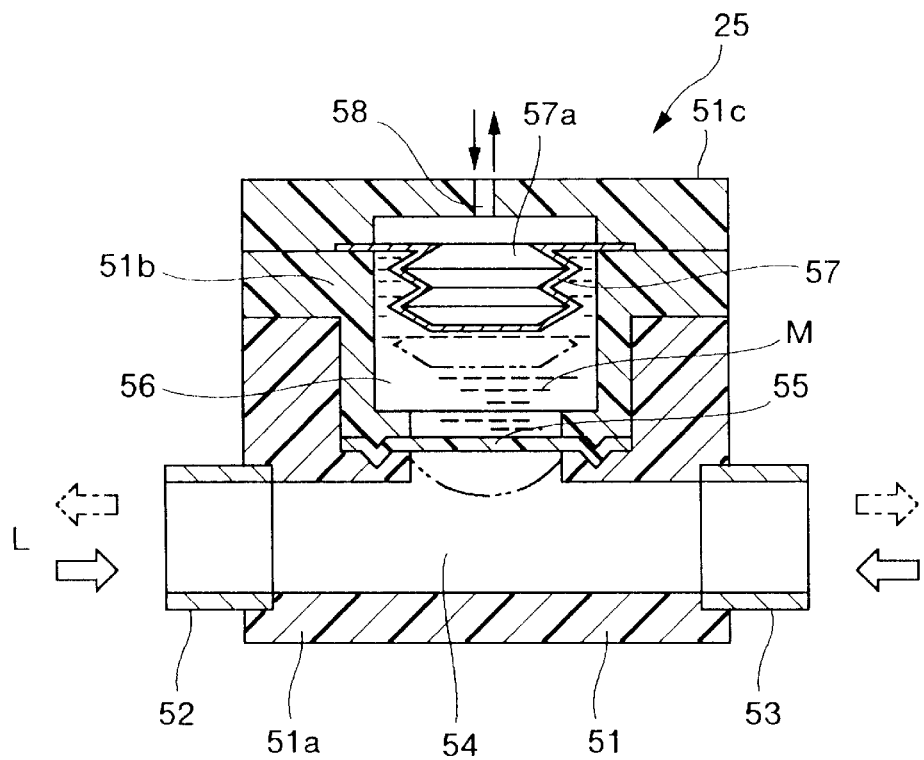
FIG. 8 is a sectional view for showing a suck-back valve according to an embodiment of the present invention.

FIG. 8 schematically shows the suck-back valve 25 of FIG. 6 in detail. A housing 51 of this suck-back valve is constructed of a lower block 51a, a cylindrical block 51b, and an upper block 51c. To the lower block 51a, a flow-in-side tube path 52 and a flow-out-side tube path 53 are connected. The housing 51 is manufactured by either a synthetic resin material such as PFA, of a metal such as a stainless steel.

A suck-back chamber 54 for communicating these tube paths 52 and 53 is formed as a communication portion on the lower block 51a. To control a volume of this suck-back chamber 54, a suck-back diaphragm valve body 55 is mounted between the lower block 51a of the housing 51 and the cylindrical block 51b. This suck-back diaphragm valve body 55 is made of a synthetic region such as PTFE.

A control medium storage chamber 56 defined with respect to the suck-back chamber 54 by the diaphragm valve seat 55 is fabricated within the housing 51. The attenuation characteristic control medium M is filled into this control medium storage chamber 56. As a drive means for giving pressure to this attenuation characteristic control medium M, a bellows-shaped drive bellows 57 is arranged within the control medium storage chamber 56.

The drive bellows 57 contains therein a pressure applying chamber 57a, and is driven in the stretching/compressing mode by supplying the compressed air from a supply/exhaust port 58 formed on the upper block 51c, being communicated with this pressure applying chamber 57a, and by vacuum-sucking the compressed air, so that the suck-back diaphragm valve body 55 is driven via the attenuation characteristic control medium M stored within the control medium storage chamber 56. Also, the drive bellows 57 is made of a synthetic resin such as PTFE.

Figure 2:
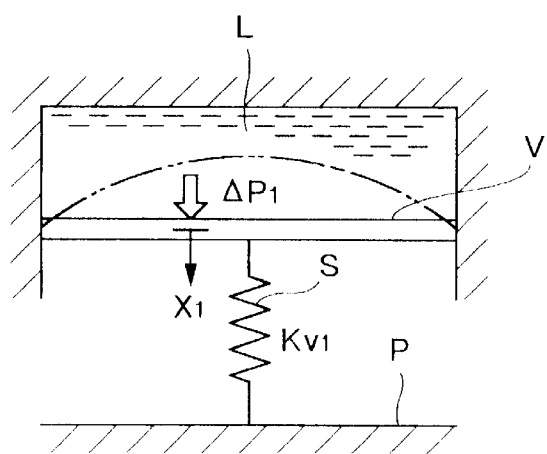
FIG. 2 schematically indicates a drive model of a valve operation mechanical unit of the conventional switching valve shown in FIG. 1.
Figure 3:
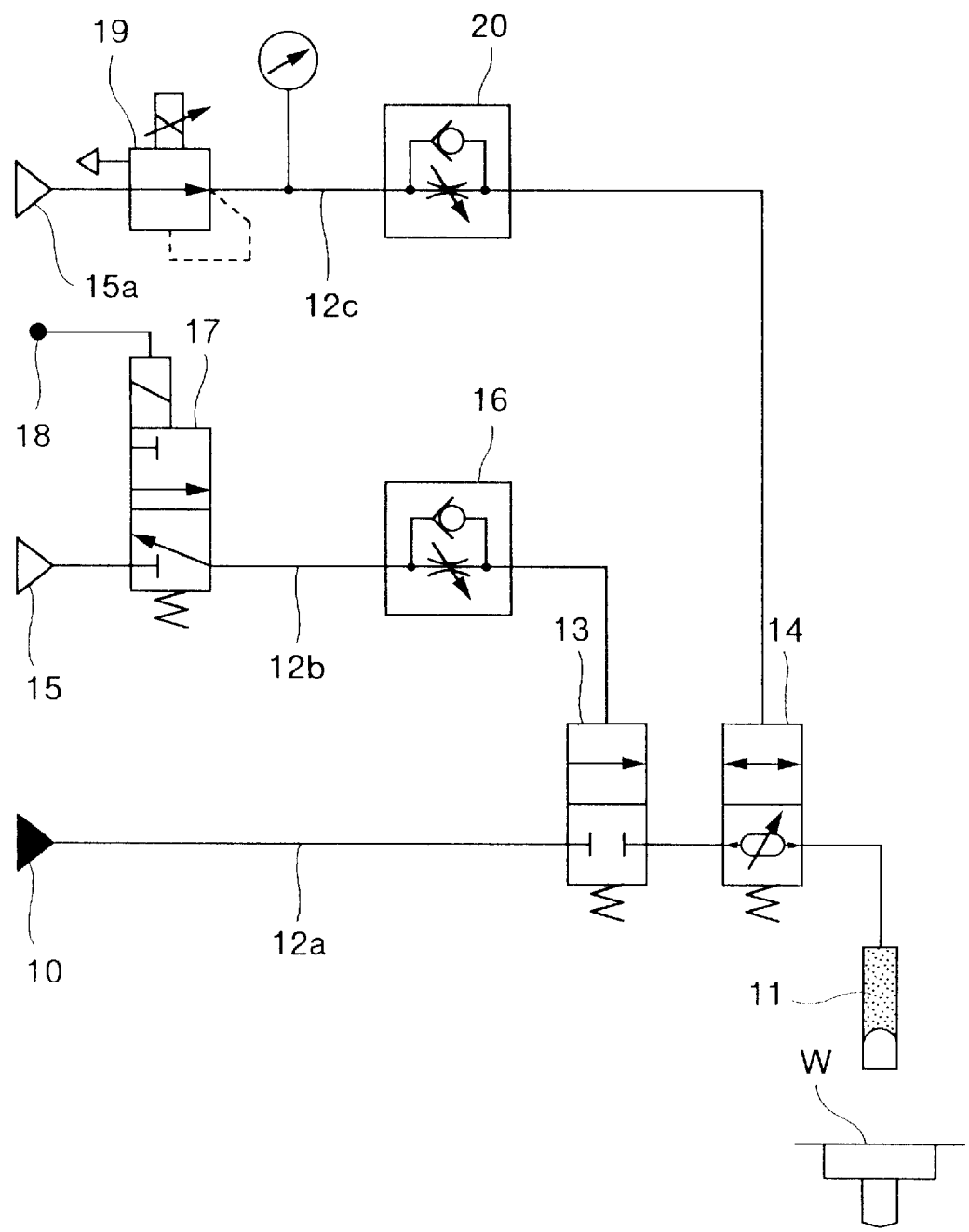
FIG. 3 is a schematic diagram for indicating a distributing tube arrangement of a fluid member supply control apparatus.
Figure 5A:
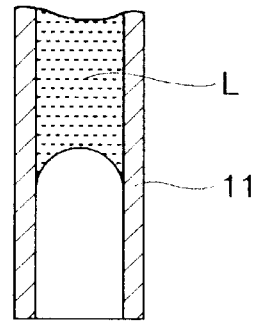
FIGS. 5A, 5B and 5C are sectional views for indicating suck-back valve operation speeds and suck-back conditions in the dripping nozzle.
Figure 5B:
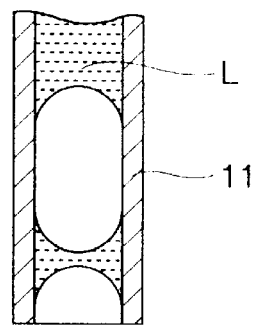
Figure 5C:
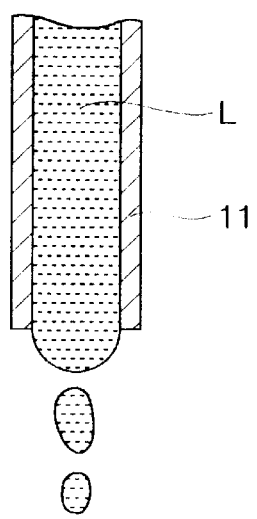
Figure 9:
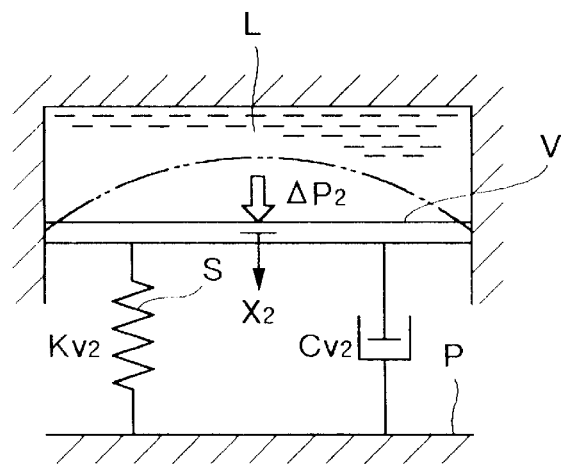
FIG. 9 schematically represents a drive model of a valve operation mechanism unit of the switching valve according to the present invention.

FIG. 9 schematically shows a drive model of the valve operation mechanism unit for the switch valve 24 shown in FIG. 7 and the suck-back valve 25 shown in FIG. 8. It should be noted that the same reference numerals are employed as those for denoting similar components employed in the drive model of the valve operation mechanism unit for the comparison example indicated in FIG. 2.

According to the valve of the present invention, since the valve mechanism unit contains the attenuation characteristic control medium M filled in the control medium storage chambers 37 and 56, as illustrated in the drive model diagram, the fluid member, namely a temporal pressure variation given from the medical fluid L side to the valve mechanism unit V is attenuated by the attenuation characteristic control medium M at a valve drive operation point "P". As a consequence, other than the spring constant $K_{V2}$ by the elastic member S shown in FIG. 2, a viscosity attenuation coefficient $C_{V2}$ of the attenuation characteristic control medium M having such a viscosity attenuation characteristic for attenuating the temporal pressure variation amount is added between the valve mechanism unit V and the valve drive operation point P. Thus, the drive model of the valve mechanism unit V as shown in FIG. 9 is constituted.

In connection therewith, according to the present invention, both of the pressure variation amount of the fluid member L and the energy amount of the valve mechanism unit V are given by the following formula:

$$\Delta P_2 = K_{V2} \times X_2 + C_{V2}(dX_2/dt).$$

In this formula, symbol $\Delta P_2$ indicates a pressure variation of the fluid member L, symbol $K_{V2}$ denotes a spring constant of the valve mechanism unit V, symbol $X_2$ shows a deviation amount of the valve mechanism unit V, symbol $C_{V2}$ represents the viscosity attenuation coefficiency of the attenuation characteristic control medium, and symbol t shows time required when the valve mechanism unit V is deviated by an amount $X_2$.

Based on this energy amount absorbing formula, the valve of the viscosity attenuation coefficiency $C_{V2}$ of the attenuation characteristic control medium M for constituting the valve mechanism unit is set to an arbitrary value. Therefore, it can be seen that a substantial amount of energy produced in connection with the temporal pressure variation $\Delta P_2$ of the fluid member L can be absorbed by the attenuation characteristic control medium M.

Even when the hammering phenomenon happens to occur while the switch valve provided in the fluid member supply apparatus is open/closed, and thus the temporal pressure variation amount of the fluid member L is produced, this may be attenuated and absorbed by the attenuation characteristic control medium M provided in the valve mechanism unit in accordance with this principle. As a result, such a drive control system is realized which is operated in response to the control pressure value exerted to the attenuation characteristic control medium provided in the value mechanism unit without being adversely affected by external disturbances such as pressure variations of the fluid member.

Figure 10:
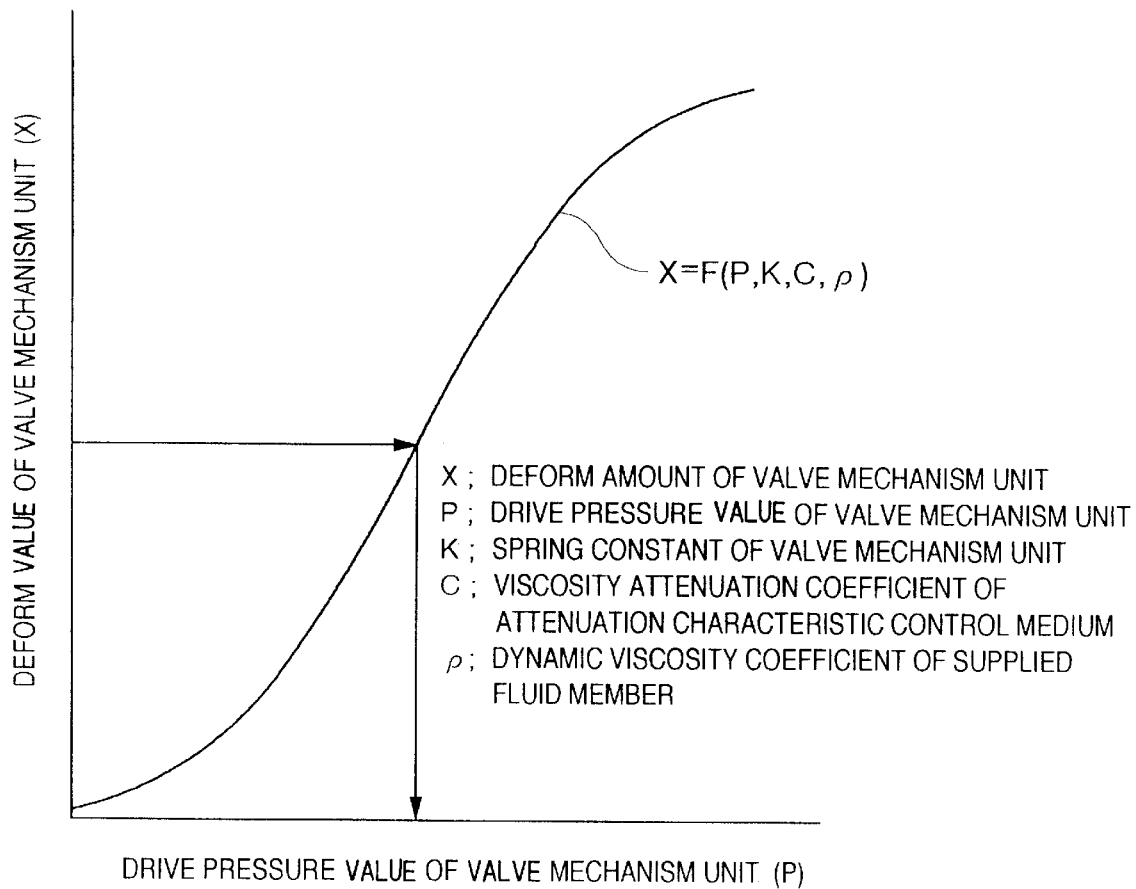
FIG. 10 is a graphical representation for a drive characteristic of the valve.

According to the present invention, in addition to such a valve drive control system, as indicated in FIG. 10, a valve drive characteristic is obtained. Concretely speaking, based on the dynamic fluid characteristic of the fluid member L, and the dynamic fluid characteristic of the valve drive control medium M having the viscosity attenuation characteristic added to the valve mechanism structure portion, a relationship between a deform amount (X) of the valve mechanism unit and a valve mechanism unit drive pressure valve (P) corresponding to one of the valve drive condition values is obtained by the actual measurements. This relationship formula is given as follows;

$$X = F(P, K, C, \rho).$$

In this relationship formula, symbol X indicates the deform amount of the valve mechanism unit such as the diaphragm valve body, symbol P shows a drive pressure value applied to the pressure chamber of the valve mechanism unit, symbol K indicates a spring constant of the valve mechanism unit, symbol C shows the viscosity attenuation coefficient of the attenuation characteristic control medium M, and symbol "$\rho$" denotes the dynamic viscosity coefficient, corresponding to an effective dynamic viscosity efficient covering the characteristic of the valve distributing tube system. The valve drive characteristic is registered into a ROM of the calculation process unit 28.

In accordance with the present invention, based upon the resultant relationship about the valve drive characteristic, the drive control pressure valve corresponding to one of the valve drive condition values effected to the valve drive control medium M is controlled to thereby optimize the drive control pressure valve, so that the valve for controlling the supply of the fluid member can be driven/controlled in higher precision.

Figure 1:
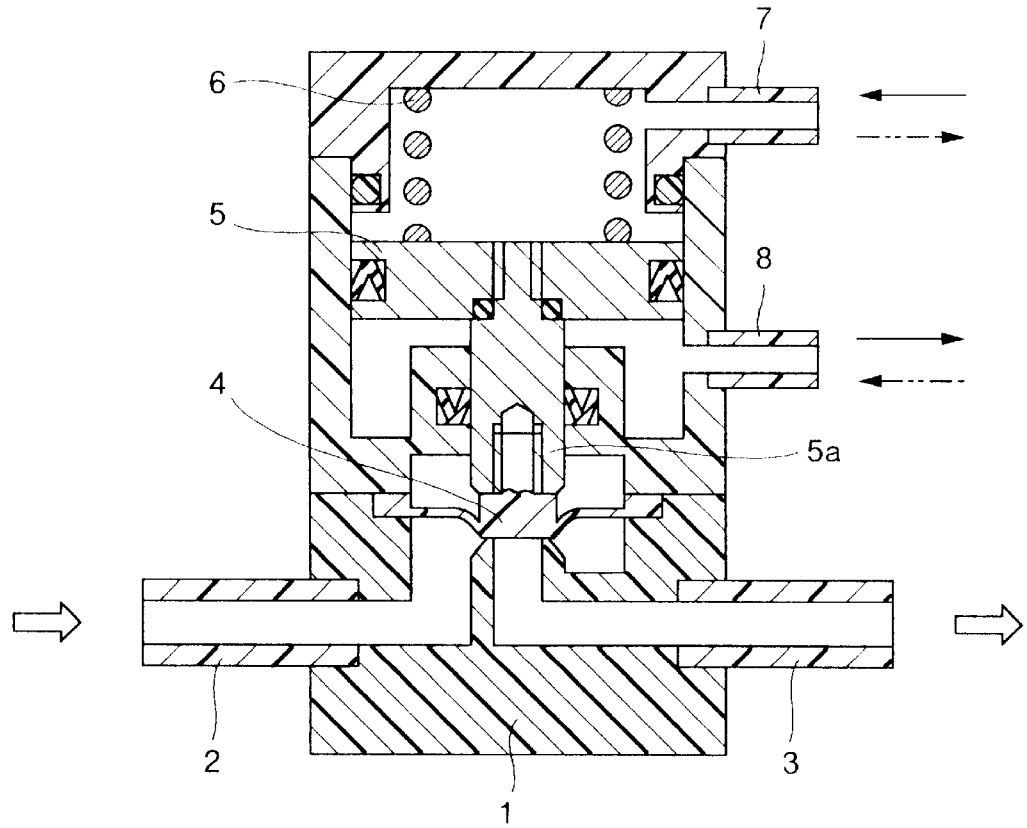
FIG. 1 is a sectional view for showing the conventional switching valve.

According to the present invention, as the valve shown in FIG. 1, even when the temporal pressure variation happens to occur in the fluid member L, this temporal pressure variation of the fluid member "L" is not directly given to the valve mechanism structural unit, so that the erroneous operation of the valve mechanism structure unit can be prevented by using such a principle.

Figure 11:
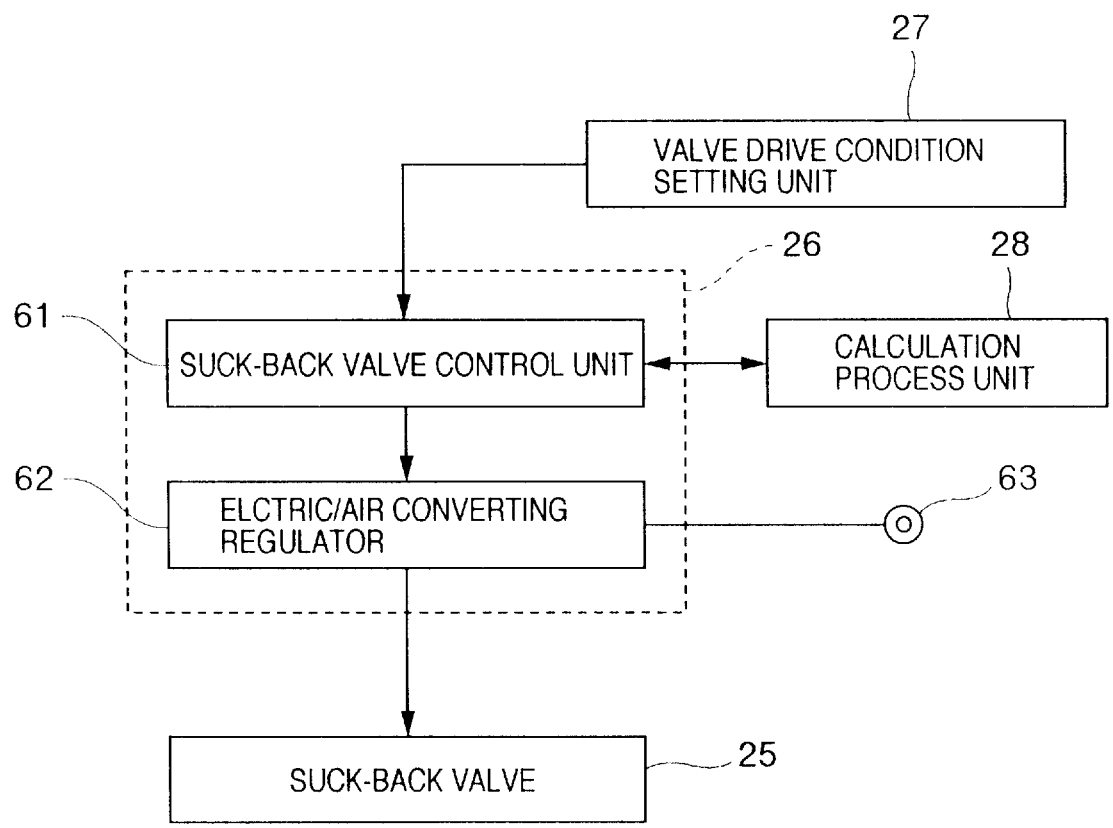
FIG. 11 is a schematic block diagram for showing a control circuit for controlling operation of the suck-back valve shown in FIG. 8.

FIG. 11 schematically indicates a control circuit for controlling operations of the suck-back valve 25 shown in FIG. 8. In this case, the electric control amount is controlled by utilizing the relative relationship between the electric control amount and the gas body pressure control amount in order to control the pressure of the gas body supplied into the drive bellows 57 of the suck-back valve 25 build in the attenuation characteristic control medium.

As represented in FIG. 11, the control unit 26 includes a suck-back valve control unit 61 and an electric/air converting regular 62. The electric/air converting regular 62 converts the electric control signal derived from this suck-back valve control unit 61 into pressure of compressor air supplied to the drive bellows 57. Air pressure is applied from an air pressure since 63 to this electric/air converting regular 62.

Now, a description is made of concrete control operations. That is, the suck-back valve control condition information containing information about a medical fluid suck-back amount, information about a medical fluid suck-back speed, and preferably viscosity of the medical fluid is sent from the valve drive condition setting unit 27 to a suck-back valve control unit 61. Based on the suck-back valve drive condition information, information about a deform amount of the suck-back valve mechanism unit is set/sent from this suck-back valve control unit 61 to the calculation process unit 28.

In the calculation process unit 28, a calculation is made, based upon the characteristics of FIG. 10, of the optimum drive pressure value of the valve mechanism unit in accordance with the information about the deform amount of the suck-back valve mechanism unit. This optimum drive pressure value is used to control the driving operation of the suck-back valve 25 containing the attenuation characteristic. Then, the calculated optimum drive pressure value is outputted to the suck-back valve control unit 61. In response to the optimum drive pressure valve entered from the calculation process unit 28, the suck-back valve control unit 61 outputs a signal of such an electric control amount corresponding to the suck-back valve operation amount to the electric/air converting regulator 62.

In response to this entered electric control amount, the electric/air converting regulator 62 controls the pressure of compressed air supplied from the air pressure source 63 into such a control amount corresponding to the drive pressure value of the valve mechanism unit shown in FIG. 10. Namely, an air pressure control amount corresponding to the optimum suck-back valve operation amount is supplied to the pressure applying chamber 57a within the drive bellows 57 of the suck-back valve 25. As a result, the sackback valve 25 is operated based upon the suck-back valve drive condition information set by the suck-back valve control unit 61.

Also, the switch valve 24 indicated in FIG. 7 may be controlled in accordance with a similar control circuit to that of FIG. 11.

Next, a description will be made of operations with respect to the medical fluid supply apparatus containing the switch valve 24 and the suck-back valve 25, as represented in FIG. 6.

Before performing the suck-back operation to suck back the fluid member L such as the medical fluid, the compressed air is supplied from the supply/exhaust port 58 shown in FIG. 8 into the pressure applying chamber 57a within the drive bellows 57. Thus, the drive bellows 57 is pressured to be expanded until a position indicated by a two-dot/dash line of FIG. 8, and the suck-back diaphragm valve body 55 is pressured via the attenuation characteristic control medium M to be deformed until the position indicated by the two-dot/dash line. Under such a condition that the volume of the suck-back chamber 54 becomes small, the piston 39 of the switch valve 29 shown in FIG. 7 is moved backwardly, so that the medical fluid, i.e., the fluid member L derived from the medical fluid supply unit 21 is dripped or dropped from the dripping nozzle 22 to a surface of a semiconductor wafer.

When the switch valve 24 is closed to interrupt the supply of the medical fluid from the medical fluid supply unit 21 so as to suck back a preselected amount of medical fluid into the dripping nozzle 22 after the dripping operation is ended, as shown in FIG. 8, the compressed air is externally exhausted via the supply/exhaust port 58 of the suck-back valve 25 shown in FIG. 8 into the pressure applying chamber 57a. As a result, the drive bellows 57 contracts/deforms, and then is returned to the initial position indicated by a solid line of FIG. 8. Furthermore, the suck-back diaphragm valve body 55 is returned to the original condition in accordance with the operation opposite to the above-described operation. Therefore, since the volume of the suck-back chamber 54 is increased, a predetermined amount of medical fluid is sucked back into the suck-back chamber 54. As a consequence, the medical fluid is sucked back into the dripping nozzle 22, so that the fluid drop of this medical fluid can be avoided.

Also, in this embodiment, the suck-back diaphragm valve body 55 is deformed/driven via the attenuation characteristic control medium M filled into the control medium storage chamber 56 between the diaphragm valve body 55 and the drive bellows 57, the diaphragm valve body 55 can be driven/controlled in higher precision without being adversely influenced by the fluid pressure variation given from the fluid member L such as the medical fluid.

Although the pressure is applied to the attenuation characteristic control medium M by way of the drive bellows 57 in the suck-back valve 25 shown in FIG. 8, the pressure may be applied thereto by employing the piston in 9 similar to the switch valve 24 shown in FIG. 7. It should be noted that as shown in FIG. 8, since it is the non-contact drive method by utilizing the contract/expansion deform of the drive bellows 57, the V packings 44 and 45 shown in FIG. 7 are no longer required, there is no drive resistive force, and furthermore, there is no variation in the drive resistive force. As these relative effects, it is possible to control the deform of the suck-back diaphragm valve body 55 having very good response characteristics.

Although the open/close operation of the diaphragm valve body 35 is carried out by employing the piston 39 in the switch valve 24 of FIG. 7, the open/close drive operation of the diaphragm valve body 35 may be carried out by using the drive bellows 57 in a similar to the suck-back valve 25 shown in FIG. 8. In this modification, it is possible to achieve such a non-contact type switch valve having very good response characteristic.

Figure 12:
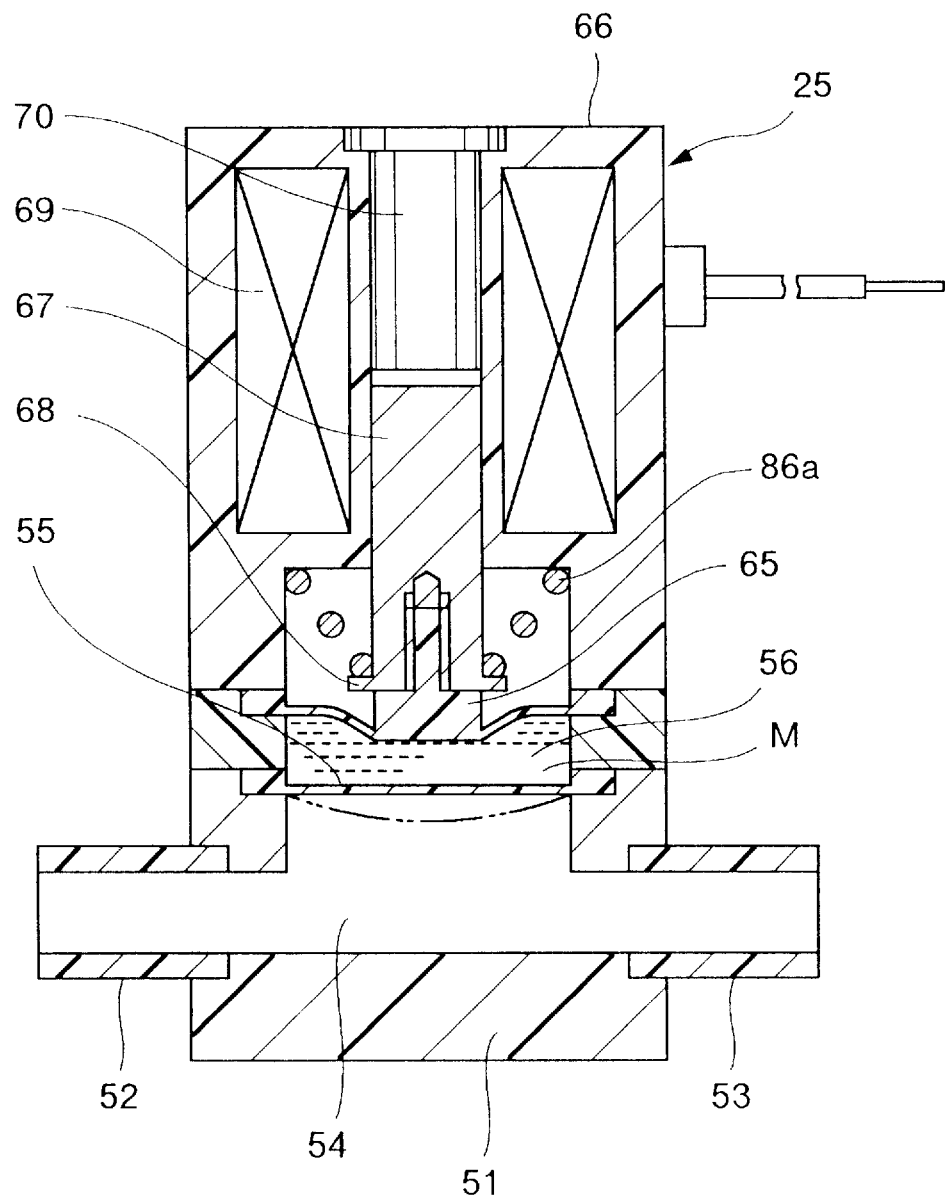
FIG. 12 is a sectional view for indicating another suck-back valve according to a further embodiment of the present invention.
Figure 13:
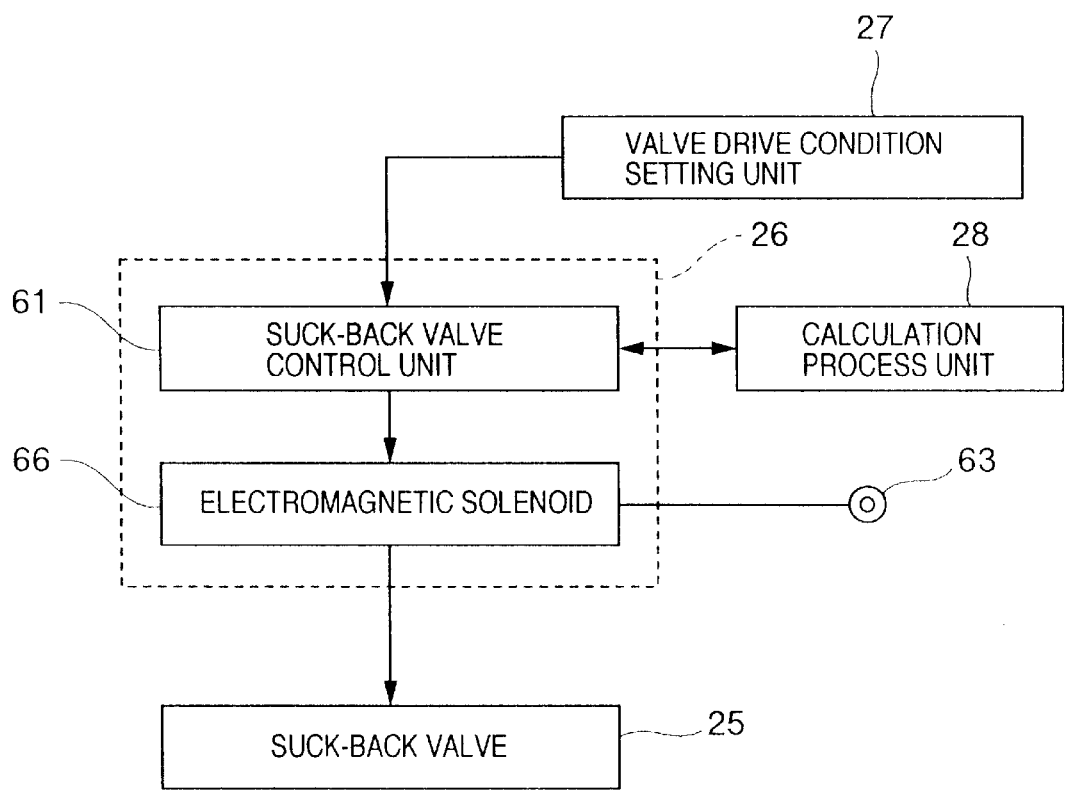
FIG. 13 is a schematic block diagram for showing a control circuit for controlling operations of the suck-back valve shown in FIG. 12.

FIG. 12 schematically represents a suck-back valve according to another embodiment of the present invention. FIG. 13 is a schematic block diagram of a control circuit for controlling operations of the suck-back valve indicated in FIG. 12. In FIG. 12, the same reference numerals are given to constructive components commonly used in those of the suck-back valve 25 indicated in FIG. 8. In FIG. 13, the same reference numerals are attache to the constructive members commonly used in those of the control circuit shown in FIG. 11.

As indicated in FIG. 12, a control medium storage chamber 56 is formed between a diaphragm drive film 65 and a diaphragm valve body 55, and the diaphragm drive film 65 is pressured/controlled by a plunger 67 made of a magnetic material and operable by a solenoid unit 66. By a compression coil spring 68a provided between the solenoid unit 66 and a flange unit 68 provided on the plunger 67, such a spring force is applied to the plunger 67 functioning as a physically displaceable pressure applying member along the forward direction.

The solenoid unit 66 has an electromagnetic coil 69, and such a magnetic force along the backward direction is applied to the plunger 67 by means of magnetic force produced from a column 70 magnetized by this electromagnetic coil 69. The plunger 67 may be moved along the forward/backward directions by way of mechanical difference pressure between the magnetic force and the spring force applied to the plunger 67. The pressure applied to the attenuation characteristic control medium M via the diaphragm drive film 65 is controlled by the plunger 67.

A control circuit shown in FIG. 13 includes a solenoid unit 66 operated in response to the electric control amount supplied from the suck-back control unit 61. The valve drive applying pressure is applied by this solenoid unit 66 as a mechanical pressure control amount to the diaphragm drive film 65. As a consequence, in response to an optimum drive applying pressure valve of the suck-back valve mechanism drive unit accessed by the calculation process unit 28, since the electromagnetic solenoid is controlled based on an electric control amount corresponding to the suck-back valve operation amount, the solenoid unit 66 causes the diaphragm drive film 65 to be actuated as a direct applied pressure control amount equivalent to the suck-back valve operation amount.

As a result, similar to the case shown in FIG. 8, the suck-back valve 25 containing the attenuation characteristic control medium is operated in higher precision based on the suck-back valve drive condition information derived from the valve drive condition setting unit 27.

Figure 14:
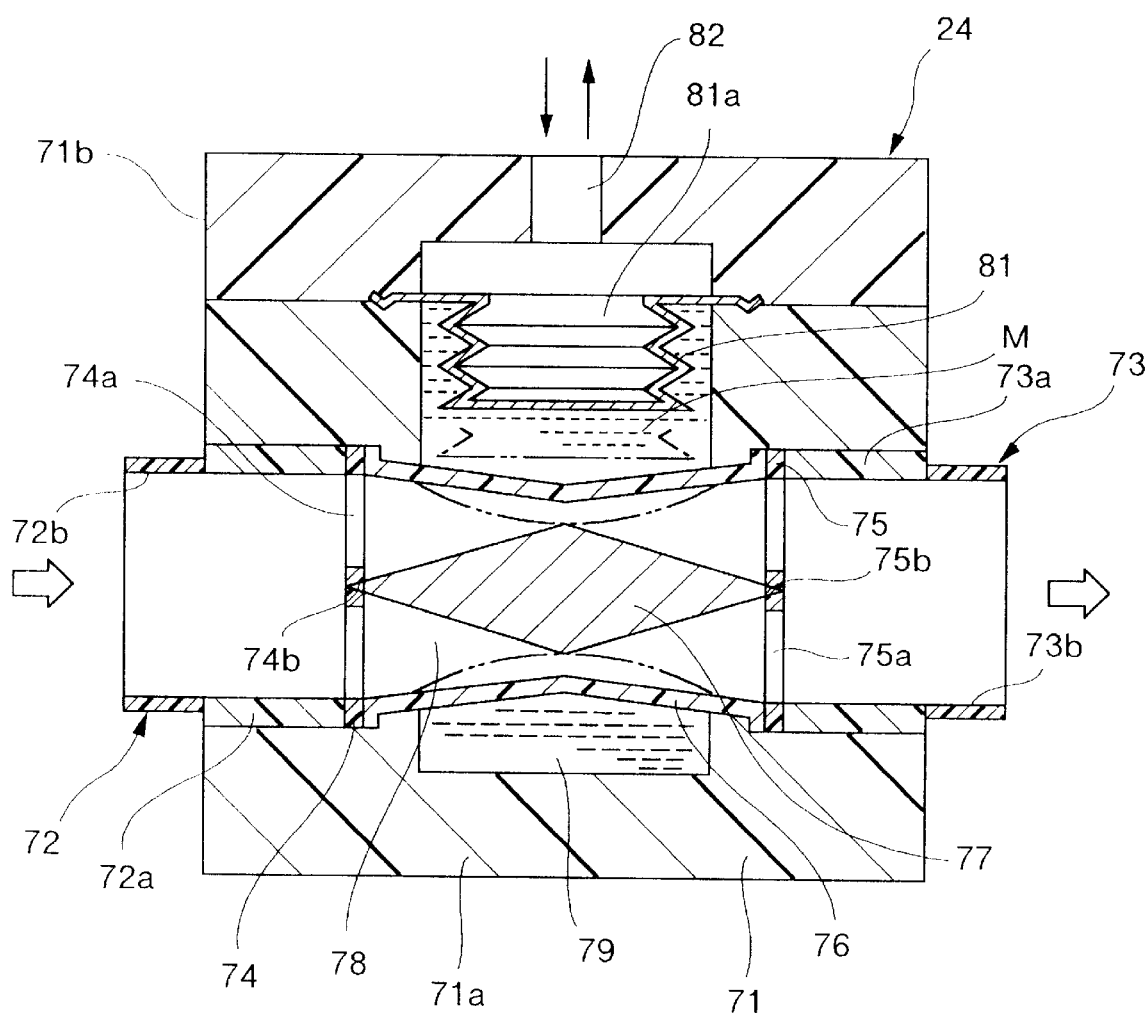
FIG. 14 is a sectional view for indicating a valve according to another embodiment of the present invention.
Figure 15:
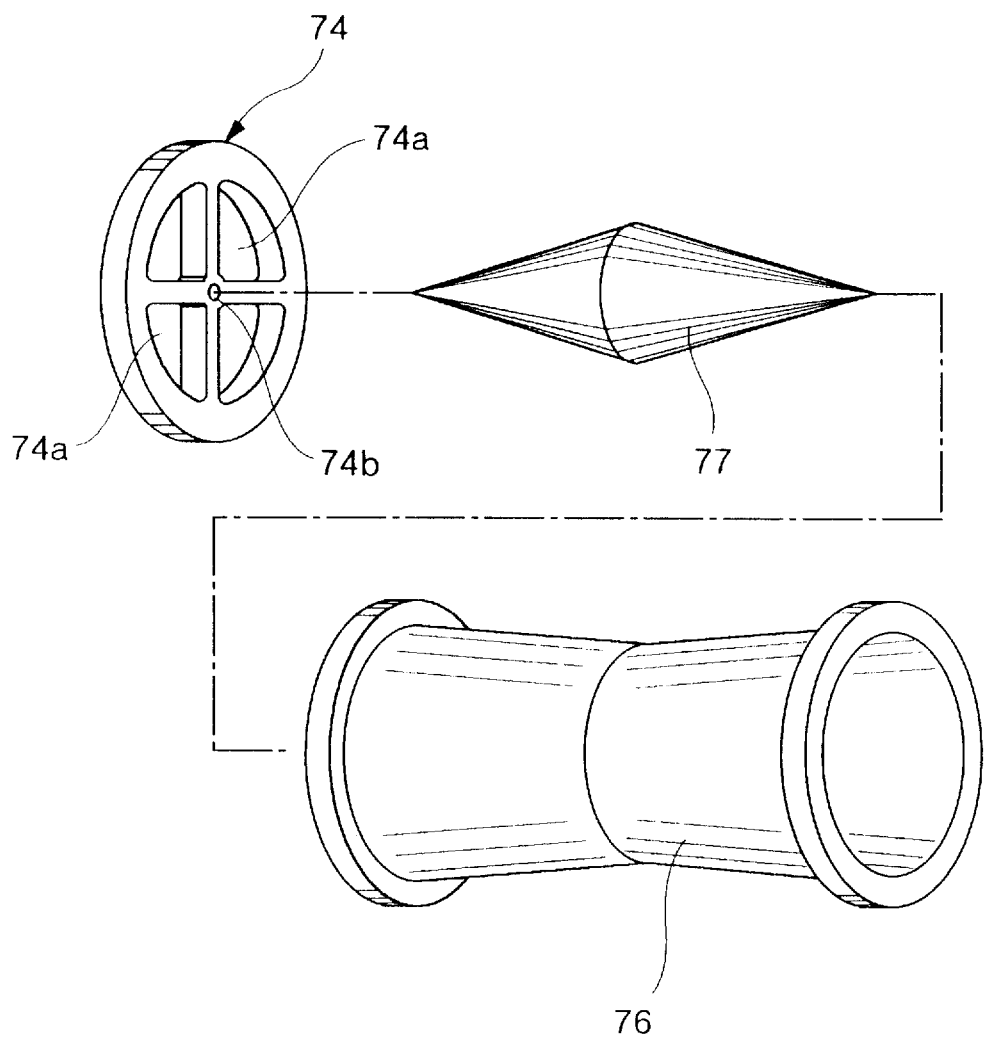
FIG. 15 explanatorily represents a relationship between a coma portion of the valve and an elastic deforming member in the embodiment of FIG. 14.

FIG. 14 and FIG. 15 schematically indicate a valve according to a further embodiment of the present invention.

This valve constitutes the switch valve 24. A flow-in-side tube path 72 and a flow-out-side tube path 73 are mounted on a housing 71 of this switch valve 24. Supporting disks 74 and 75 each having a plurality of communication holes 74a and 75a are arranged at tip portions of the respective tube paths 72 and 73. A cylindrical thin-film elastic member 76 is arranged between these supporting disks 74 and 75. Such a flow path is formed in this cylindrical thin-film elastic member 76, which may guide the fluid member L flown from the flow-in-side tube path 72 toward the flow-out-side tube path 73.

As illustrated in the drawings, this cylindrical thin-film elastic member 76 is manufactured from PFA in such a manner that an inner diameter of a central portion of this cylindrical thin-film elastic member 76 is minimum along the longitudinal direction, and a taper-shaped section is formed so as to increase the inner diameter toward the both end portions.

A pillar structural member 77 made of PFA namely a coma for constituting a valve seat is provided in the cylindrical thin-film elastic member 76. An outer diameter of a central portion of this pillar structural member 77 becomes maximum along the longitudinal direction, whereas the outer diameter thereof becomes small along the direction toward the both end portions, namely this pillar structural member 77 has a spindle shape. This pillar structural member 77 is supported by the supporting disks 74 and 75 in such a manner that both end portions thereof are engaged with the supporting holes 74b, 75b formed in the respective supporting disks 74 and 75, and are positioned at the central portion of the cylindrical thin-film elastic member 77. As a consequence, a communication portion between this pillar structural member 77 and the cylindrical thin-film elastic member 76 constitutes a switch valve chamber 78, and the cylindrical thin-film elastic member 76 is elastically expanded/contracted along the radial direction, so that the communication of the switch valve chamber 78 and the interruption of this communication are carried out.

Within the housing 71, a control medium storage chamber 79 is formed to be located outside the cylindrical thin-film elastic member 76, into which the attenuation characteristic control medium M is filled. To apply the pressure to this attenuation characteristic control medium M, a bellows type drive bellows 81 is arranged in this control medium storage chamber 79.

The drive bellows 81 contains therein a pressure apply chamber 81a. The compressed air is supplied and exhausted via a supply/exhaust port 82 formed on the copper block 71b and communicated with this pressure apply chamber 81a to the drive bellows 81, so that this drive bellows 81 can be contracted/expanded. Thus, the cylindrical thin-film elastic member 76 for constituting the switch valve member is driven via the attenuation characteristic control medium M stored in the control medium storage chamber 79. This drive bellows 81 is made of such an elastically deformable material as a stainless still. Normally, this drive bellows 81 owns the compression spring characteristic by which the drive bellows 81 is compressed.

The flow-in-side tube path 72 and the flow-out-side tube path 73 own fixed rings 72a and 73a, and tube portions 72b and 73b, respectively. To assemble the switch valve shown in FIG. 14, under such a condition that both the pillar thin-film elastic member 76 and the pillar structural member 77 are inserted into the lower block 71a of the housing 71, the supporting disks 74 and 75 are pushed into both sides thereof. As a consequence, the pillar-shaped structural member 77 is supported by the supporting disks 74 and 75 at both ends thereof, and also as indicated by a solid line of FIG. 14, the cylindrical thin-film elastic member 76 is deformed in such a condition that the center portion thereof has the minimum diameter along the longitudinal direction. Under this condition, the cylindrical thin-film elastic member 76 is melt to be connected to the housing 71. Subsequently, the supporting disks 74 and 75 are melted to be connected to the housing 71. As a result, the cylindrical thin-film elastic member 76 and the housing 71 are brought into the completely closing condition.

Furthermore, the fixed rings 72a and 73a are inserted into the housing 71, and are melted to be connected to the housing 71, and tube portions 72b and 73b are melted to be connected to the respective fixed rings 72a and 73a.

The switch valve 24 shown in FIG. 14 is controlled by a control circuit similar to the control circuit of FIG. 11. A description will now be made of operations of this switch valve 24.

When the compressed air is supplied from the supply/exhaust port 82 of the drive bellows 81 into the pressure apply chamber 81a, the drive bellows 81 is deformed at a position indicated by a two-dot/dash line. As a consequence, the attenuation characteristic control medium M is pressured, and then the cylindrical thin-film elastic member 76 is deformed to become such a shape as shown by a two-dot/dash line. The cylindrical thin-film elastic member 76 is closely fitted to the pillar structural body 77 for constituting the valve seat, so that the switch valve chamber 78 is closed. In other words, the flow of fluid member L from the flow-in-side tube path 72 to the flow-out-side tube path 73 is closed.

On the other hand, when the pressure apply chamber 81a is opened without supplying the compressed air from the supply/exhaust port 82, the drive bellows 81 is contracted due to the own elastic force. As a result, the pressure of the attenuation characteristic control medium M is lowered, and the cylindrical thin-film structural member 76 is expanded, so that the contact condition with the pillar structural member 77 is released and the flow path is open.

The switch valve 24 according to this embodiment is such a normally open type switch valve that when no compressed air is supplied from the supply/exhaust port 82, the switch valve is open in response to the elastic force owned by the drive bellows 81. Conversely, this switch valve 24 may be constituted by such a normally close type switch valve that when no compressed air is supplied from the supply/exhaust port 82, the switch valve is closed. The normally close type switch valve may be obtained by changing the specification of the spring material from the compression spring specification (compressing mode) into the compression spring specification (expanding mode).

FIG. 14 represents the switch valve 24, and may constitute the suck-back valve by removing the pillar structural member 77 and the supporting disks 74 and 75. It should be noted that the shape of the cylindrical thin-film elastic member is not made of the taper shape, but may be made of various shapes such as a straight form.

Figure 16:
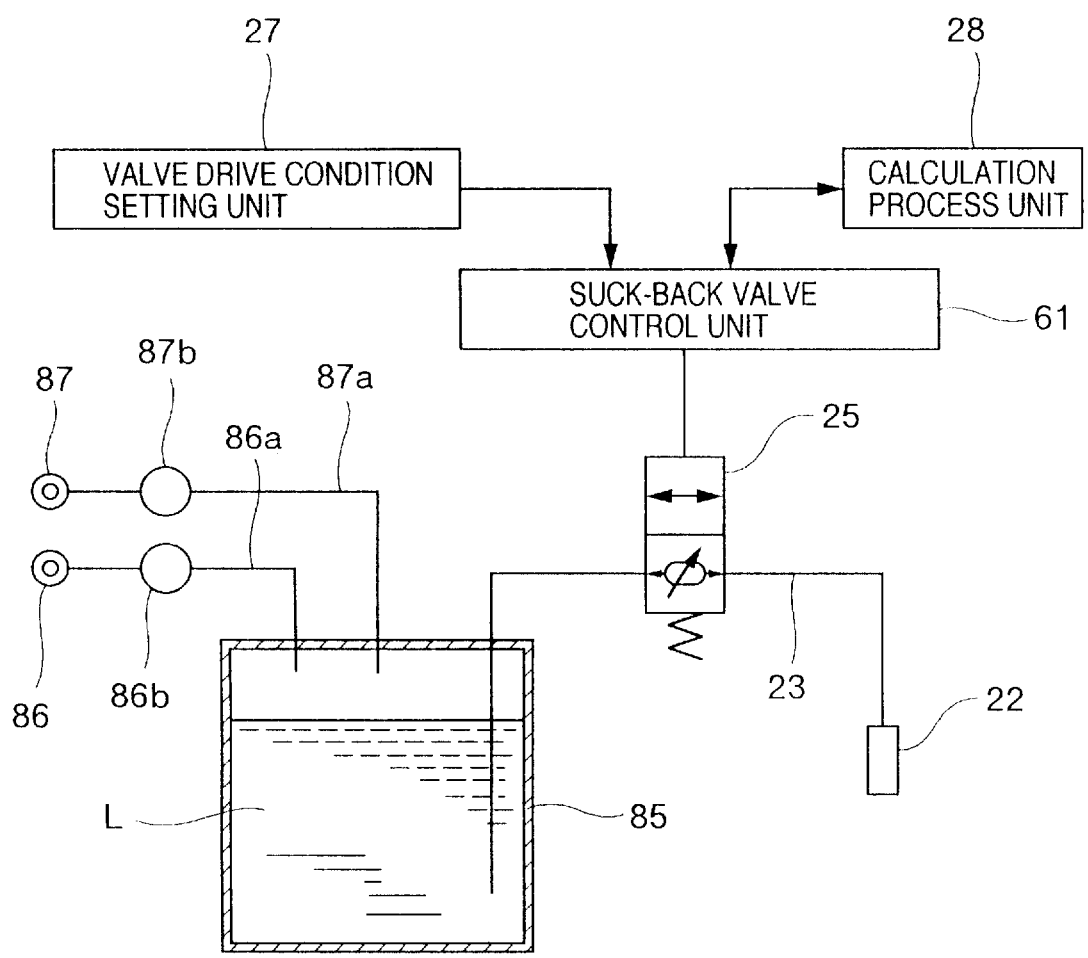
FIG. 16 schematically represents another system arrangement of the fluid member supply control apparatus of the present invention.

FIG. 16 schematically indicates a fluid member supply control apparatus according to an embodiment of the present invention. A medical fluid supply unit is formed by a sealing type pressure apply vessel 85 for containing a medical fluid "L". Both of a pressure apply path 86a connected to a pressured air supply source 86, and a negative pressure air supply path 87a connected to a negative pressure air supply source 87 are connected to an upper portion of this pressure apply vessel 85. Valves 86b and 87b are provided on the respective supply paths 86a and 87a so as to open/close these supply paths.

To supply the medical fluid within the pressure apply vessel 85, namely the fluid member L to the dripping nozzle 22, the supply tube path 23 is provided between the dripping nozzle 22 and the pressure apply vessel 85, and the suck-back valve 25 is provided in this supply tube path 23. As this suck-back valve 25, such suck-back valves containing the attenuation characteristic control mediums shown in FIG. 8 and FIG. 12 are used.

In the fluid member supply control apparatus with the above-described mode, the switch valve is no longer required, and the pressure apply vessel 85 having the pressure apply path 86a can function as this switch valve.

While the present invention has been described in detail with reference to the embodiments, the present invention is not limited to the above-described embodiments, but may be changed, modified, and substituted without departing from the technical scope of the present invention.

Although the medical fluid has been utilized as the supplied fluid member in the embodiments shown in the drawings, fluids having various characteristics and various coefficients of viscosity may be used instead of the medical fluid. Also, as the fluid member supply control apparatus having the valve, the present invention may be applied to any fluid member supply control apparatus having only the switch valve, or the suck-back valve. Furthermore, a partition member is provided in the control medium storage chamber to subdivide this storage chamber, and then either a fixed orifice, or a variable orifice may be formed in the subdivided storage chamber. As a result, the subdivided control medium storage chambers may be communicated with each other through the orifices to achieve the attenuation function.

The above-described embodiments belong to the technical field of the semiconductor wafer manufacturing apparatus, but the present invention is not limited thereto. For instance, the present invention may be effectively applied to the resin coating apparatus as described in JP-A-54-48160, the color CRT frit glass coating apparatus as described in JP-A-57-177365, the multi-potting apparatus as described in JP-A-57-177570, and also the electronic component adhesive dispenser as recitated in JP-A-60-95977. Also, the present invention may be applied to such a technique for supplying/processing a preselected amount of a fluid member at high purity and constant speed, in high precision, for example, an LCD substrate manufacturing field, a magnetic disk manufacturing field, an optical component manufacturing field, and a chemical/medical product manufacturing field.

We claim:

1. A valve drive control apparatus comprising:
    a housing provided with a flow-in-side tube path and a flow-out-side tube path, which each guides a fluid member, and also a communication unit for communicating with said tube paths;
    an elastic deform member for defining a control medium storage chamber into which an attenuation characteristic control medium is filled and said communication unit, formed in said housing,
    wherein said attenuation characteristic control medium includes a fluid having a viscosity attenuation characteristic, powder, or a mixture of a fluid and powder;
    drive means for applying pressure to said attenuation characteristic control medium so as to deform said elastic deform member via said attenuation characteristic control medium; and
    control means for controlling said drive means based on a drive control valve obtained from a valve drive characteristic representative of a relationship between a deform amount of a valve mechanism unit and a drive pressure value of the valve mechanism unit, said valve drive characteristic being acquired from a dynamic fluid characteristic of said fluid member and a dynamic fluid characteristic of said attenuation characteristic control medium.

2. A valve drive control apparatus as claimed in claim 1 wherein:
    said drive means includes an expanding/contracting member elastically deformed by a gas member; and
    said control means includes electric signal generating means for generating an electric control amount corresponding to said drive control value; and pressure setting means for setting pressure of the gas member corresponding to the electric control amount generated from said electric signal generating means.

3. A valve drive control apparatus as claimed in claim 1 wherein:
    said drive means includes a pressure applying member physically displaced; and said control means includes electric signal generating means for generating an electric control amount corresponding to said drive control value; and pressure setting means for setting a displacement valve of said pressure applying member corresponding to the electric control amount generated from said electric signal generating means.

4. A valve drive control apparatus as claimed in claim 2 wherein:
    said communication unit is provided in such a manner that said communication unit penetrates through said control medium storage chamber; said elastic deform member for defining said communication unit and said control medium storage chamber owns a ring-shaped section perpendicular to said communication unit; and said valve drive control apparatus further comprises a coma within said communication unit; and also said control means includes means for controlling a fluid condition of said fluid member based on said drive control value to control a distance between said coma and said elastic deform member.

5. A fluid member supply control apparatus equipped with a fluid member supply unit, a fluid member flow-out unit, and at least one valve provided within a tube path for connecting said fluid member supply unit to said fluid member flow-out unit, for changing an open degree of a communication unit for communicating a fluid member flow-in tube path with a fluid member flow-out tube path to thereby control a fluid condition of the fluid member, wherein:
    said at least one valve includes:
        a control medium storage chamber into which an attenuation characteristic control medium is filled, wherein said attenuation characteristic control medium includes a fluid having a viscosity attenuation characteristic, powder, or a mixture of a fluid and powder;
        an elastic deform member for defining said control medium storage chamber and said communication unit;
        a drive unit for pressuring said attenuation characteristic control medium to deform said elastic deform member via said attenuation characteristic control medium; and control means for controlling said drive unit based on a drive control value obtained from a valve drive characteristic representative of a relationship between a deform amount of a valve mechanism unit and a drive pressure value of the valve mechanism unit, said valve drive characteristic being acquired from a dynamic fluid characteristic of said fluid member and a dynamic fluid characteristic of said attenuation characteristic control medium.

6. A fluid member supply control apparatus as claimed in claim 5 wherein:

said valve for deforming said elastic deform member via said attenuation characteristic control medium is a switch valve for opening/closing said communication unit.

7. A fluid member supply control apparatus as claimed in claim 5 wherein:

said valve for deforming said elastic deform member via said attenuation characteristic control medium is a suck-back valve for changing a volume of said communication unit.

* * * * *